April 17, 1962   F. E. WOLF   3,029,695
MICROSCOPE SLIDES
Filed May 2, 1960

*INVENTOR.*
FRANK E. WOLF
BY
*Philip E. Hibert*
ATTORNEY

United States Patent Office 3,029,695
Patented Apr. 17, 1962

3,029,695
MICROSCOPE SLIDES
Frank E. Wolf, 466 Island Road, Lunenburg, Mass.
Filed May 2, 1960, Ser. No. 25,961
3 Claims. (Cl. 88—40)

This invention relates to microscope slides, and more particularly, concerns slides adapted for microprojection.

An object of this invention is to provide a microscope slide of improved construction, which may be used for direct viewing, for projection, for oil immersion viewing, and for storing specimens.

Known microscope slides present several problems in usage for either direct viewing, for projection or with an oil immersion objective. Thus, the conventional slide of the "hanging drop" type, must be used with a cover glass, in oil immersion viewing techniques. The cover glass is held in place on the slide by a ring of petroleum jell. If the microscope is tilted, the specimen disposed on the cover glass, may slide down into the cavity on the slide or into the jelly. Also, with oil immersion, the cover glass and the specimen on the underside of the cover glass, will move from said to side, as well as up and down, with adjustment of the microscope.

Accordingly, another object of this invention is to provide an improved microscope slide which prevents drying of a wet specimen by evaporation; prevents flowing movement of a specimen suspended in a medium, due to drying of the medium; prevents evaporation of the medium and eliminates need for replacement of the medium; and avoids drying of the specimen upon evaporation of the medium.

Other objects of this invention will in part be obvious and in part hereinafter pointed out.

In the drawing, FIG. 1 is a top plan view of a microscope slide embodying the invention;

Essentially, the microscope slide of the instant invention, comprises a flat transparent plate which has a sealed specimen chamber interiorly thereof, whereby the specimen received therein, whether wet or dry, is sealed in the chamber and thereby remains unaffected by manipulation of the slide as the same is disposed in the microscope and may be clearly viewed in any tilted position of the microscope body tube or stage, or with the stage in a horizontal position.

Figure 1:
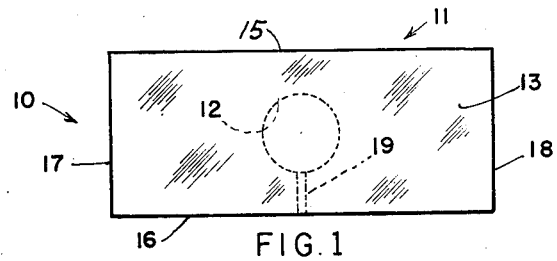
Figure 2:
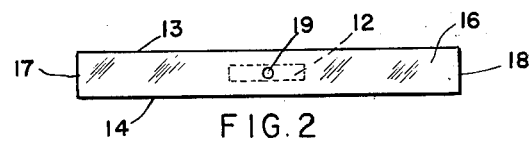
FIG. 2 is a side elevational view thereof.

Thus, as shown in FIG. 1, slide 10 of the instant invention takes the form of a flat rectangular plate of transparent material such as glass or optically transparent synthetic plastic such as polystyrene, vinyl copolymer, acrylic copolymers or the like. The plate 11 is formed with a specimen receiving chamber 12, which may be circular or of other suitable shape. Chamber 12 is located between opposed plate faces 13, 14 and interiorly of side edges 15, 16 and end edges 17, 18.

Figure 3:
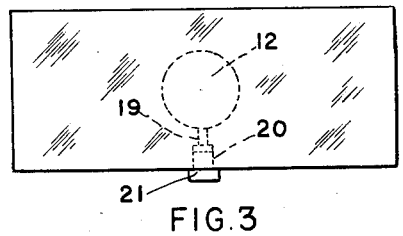
FIG. 3 is a view similar to that of FIG. 1, showing a modified form of the slide.

A passage 19 for introducing a specimen into chamber 12, is formed in edge 16 of plate 11, the outer end of said passage opening on said edge 16 and communicating at its inner end with chamber 12. Passage 19 may be of restricted diameter, about .050 to about .0650", so as to admit a hypodermic syringe needle, conveniently used to transfer the specimen into chamber 12. With a passage of such small dimensions, no closure is actually necessary. However, if desired, the outer end of passage 19 may be enlarged as shown in FIG. 3, as at 20, to receive a plug or other suitable closure member 21, thereby eliminating residual evaporation in the case of a wet specimen, or of evaporation of medium in which a specimen may be suspended. It is understood, that the outer end of passage 19, as shown in FIG. 1, may be sealed by application of tape or other suitable sealing means at plate edge 16.

While plate 11 is shown as integral in form, it is understood that the same may be of laminated construction, using two or three lamina suitably cemented together. In such case, the chamber 12 is suitably formed in the lowermost or intermediate lamina, while the topmost lamina provides a cover for the chamber. The passage 19 will be suitably formed in the lowermost or intermediate lamina, for communication with chamber 12. Thus, plate 11 may be formed by molding or laminating procedures, well known in the art.

A specimen is suitably introduced into chamber 12 of slide 10, by way of passage 19. The chamber 12 may be preliminarily evacuated by means of a hypodermic syringe, if desired, leaving the introduced specimen in a partial vacuum. The view through plate 11 will be free of bubbles, while leakage, flowing of the specimen and drying will be avoided. The slide 10 may be tilted in any direction and may be used with an oil immersion objective, without fear of disturbing the specimen as the same is viewed. The chamber 12 may be flushed and washed, after use, by means of a syringe needle or the like, allowing the slide to be reused, if desired.

Figure 4:
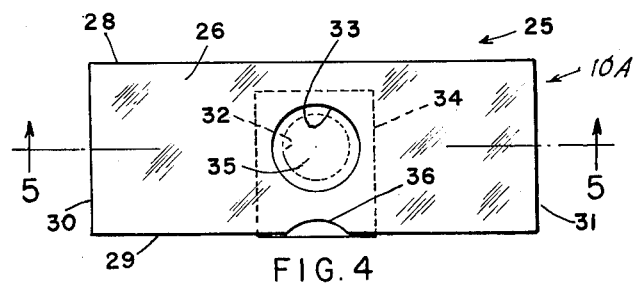
FIG. 4 is a top plan view of a slide showing another embodiment of the invention.
Figure 5:
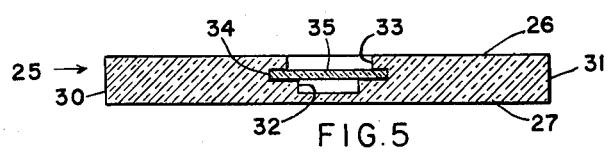
FIG. 5 is a transverse sectional view taken on the line 5—5 of FIG. 4.
Figure 6:
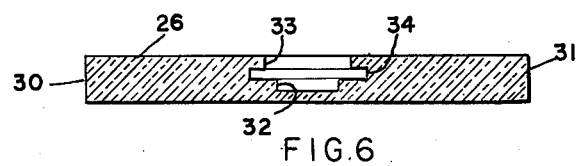
FIG. 6 is a view similar to that of FIG. 5, showing the cover slip removed.

In FIGS. 4-6, is shown a slide 10A embodying the invention and illustrating a modification thereof. Slide 10A is also formed of glass or other transparent material such as synthetic resins or the like. Slide 10A comprises a plate 25 having opposed faces 26, 27; side edges 28, 29 and end edges 30, 31.

Plate 25 is formed on a central portion thereof with a recess 32 providing a specimen receiving chamber; said recess being circular or of other suitable shape. The face 26 of plate 25 is formed with an opening 33 which communicates with recess 32; opening 33 also being of circular shape but slightly larger in diameter than recess 32. The plate 25 is further formed with a recess 34 which communicates with recess 32 and opening 33; recess 34 being of rectangular shape and having a transverse dimension greater than the diameter of recess 32 and of opening 33.

Recess 34 opens along one edge thereof on plate edge 29 and is adapted to slidably receive therein a transparent closure slip 35 which is snugly fitted into said recess 34. It will be apparent that a specimen may be readily introduced into chamber 32 by way of opening 33, and then sealed therein by insertion of closure slip 35 into recess 34. Slide 10A may be formed from an integral plate by suitable machining operations to form the recesses and openings; or may be built up by laminating procedures.

Slide 25 lends itself for usage with large specimens and also provides an integral, sealed slide which may be readily manipulated for direct viewing or projection; as well as with an oil immersion objective. In all cases, the specimen is effectively sealed and is not disturbed during the viewing operations. The top surface 26 of plate 25 may be cut along edge 29, as at 36 to expose the forward portion of cover slip 35 and facilitate the grasp of the slip 35.

As various changes might be made in the embodiments of the invention herein shown without departing from the spirit thereof, it is understood that all matter herein described or shown shall be deemed illustrative and not limiting except as set forth in the appended claims.

Having thus disclosed my invention, I claim as new and desire to protect by Letters Patent:

1. A microscope slide comprising a transparent plate, said plate being formed with a recess providing a specimen receiving chamber, one face of said plate being formed with a specimen introducing opening in communication with said receiving chamber, said plate being further formed with a closure receiving recess between said chamber and said opening, said closure receiving recess having transverse dimensions greater than the transverse dimensions of said chamber, said closure receiving recess opening along one edge of said plate, and transparent closure means slidably receivable in said closure receiving recess for sealing said chamber.

2. A microscope slide comprising a transparent plate, said plate having a specimen receiving chamber located between opposite face portions of said plate, an opening in one face of said plate in communication with said chamber for introducing a specimen into said chamber, said plate being formed with a closure receiving recess between said chamber and said opening, said recess opening on one edge of said plate, and a transparent closure means slidably insertable into said recess by way of said recess opening for movement to a position sealing off said chamber.

3. A slide as in claim 2 wherein said chamber and specimen introducing opening are circular in shape, said chamber and opening being symmetrically related, the latter being larger in diameter than the former, said closure means being of rectangular shape and said recess being of rectangular shape to slidably receive said rectangular closure means.

References Cited in the file of this patent

UNITED STATES PATENTS

| 2,351,282 | Oliver | June 13, 1944 |
| 2,940,360 | Carter | June 14, 1960 |

FOREIGN PATENTS

| 202 | Great Britain | 1884 |
| 548,942 | Belgium | July 14, 1956 |